United States Patent [19]

Roberts et al.

[11] Patent Number: 4,750,999
[45] Date of Patent: Jun. 14, 1988

[54] FILTER EMPLOYING BARRIER

[75] Inventors: Robert L. Roberts, Boothwyn; Douglas H. Eden, Harmony, both of Pa.

[73] Assignee: Roberts Filter Manufacturing Company, Darby, Pa.

[21] Appl. No.: 872,317

[22] Filed: Jun. 9, 1986

[51] Int. Cl.⁴ .................... B01D 23/18; B01D 35/28
[52] U.S. Cl. ................................ 210/266; 210/275; 210/279; 210/289; 210/291; 210/457; 55/387
[58] Field of Search ............. 210/162, 163, 266, 283, 210/285, 286, 289, 291, 293, 441, 457, 483, 279, 275; 422/143, 177, 311; 55/387

[56] References Cited

U.S. PATENT DOCUMENTS

| 459,259 | 9/1891 | Shunk | 210/163 |
|---|---|---|---|
| 1,828,282 | 10/1931 | Dotterweich | 210/289 |
| 3,006,478 | 10/1961 | Mueller | 210/291 |
| 3,037,633 | 6/1962 | Veitel et al. | 210/289 |
| 3,089,396 | 5/1963 | Rowland | 210/163 |
| 3,121,682 | 2/1964 | Alberico | 210/166 |
| 3,174,623 | 3/1965 | Sloan | 210/285 |
| 3,219,192 | 11/1965 | Trembath et al. | 210/167 |
| 3,268,920 | 8/1966 | Beer | 210/163 |
| 3,282,427 | 11/1966 | Mandariho et al. | 210/108 |
| 3,365,063 | 1/1968 | Cobb et al. | 210/167 |
| 3,466,901 | 9/1969 | Reid | 210/167 |
| 3,826,375 | 6/1974 | Fournier | 210/291 |
| 3,948,775 | 4/1976 | Otani et al. | 210/289 |
| 4,178,249 | 12/1979 | Councill | 210/281 |
| 4,379,750 | 4/1983 | Tiggelbeck | 210/232 |
| 4,418,432 | 12/1983 | Vidal | 210/163 |
| 4,460,467 | 7/1984 | Ueda | 210/276 |

FOREIGN PATENT DOCUMENTS

| 5417573 | 2/1979 | Japan | 210/162 |
|---|---|---|---|
| 956826 | 4/1964 | United Kingdom | 210/293 |

Primary Examiner—Richard V. Fisher
Assistant Examiner—Linda S. Evans
Attorney, Agent, or Firm—Caesar, Rivise, Bernstein, Cohen & Pokotilow

[57] ABSTRACT

A filter includes a bed of particulate solids for removal of contaminants from a fluid directed in a downstream direction therethrough. A barrier is located downstream of the bed of particulate solids and includes an anchoring member having flexible members joined thereto and projecting outwardly therefrom. The flexible members are closely spaced to each other for providing a closely-spaced network of flexible members to establish multiple barrier layers in the downstream direction of fluid flow through the barrier. In one embodiment the barrier is in the form of a planar member generally coextensive with a bottom wall of the filter and includes a plurality of anchoring members spaced-apart horizontally from each other. In another embodiment the barrier is in the form of a strainer with the anchoring members being spaced-apart vertically from each other and with the flexible members joined thereto being spaced transversely along the anchoring members to provide the multiple barrier layers.

23 Claims, 2 Drawing Sheets

FILTER EMPLOYING BARRIER

BACKGROUND OF THE INVENTION

This invention relates generally to a filter, and more specifically to a filter employing a liquid-solid contacting chamber and including a unique barrier downstream of a filter bed of particulate solids employed to treat liquid directed through the chamber.

It is common practice in liquid treatment filter systems, such as systems employed in the treatment of water and waste water, to employ a filter bed of particulate solids to remove undesired contaminants from the liquid being treated. Generally the particulate solids making up the filter bed are quite small, e.g., having an average particle size of 0.5 mm or less, requiring the use of one or more inert supporting layers to prevent the filter media from being carried out of the filter system with the liquid being treated. One common approach to supporting such a bed of particulate solids is to provide multiple layers of larger inert particulate material, such as gravel, as the supporting substrate.

One of the benefits of employing one or more gravel supporting layers is that the gravel particles are free to move relative to each other. Therefore, the particles will displace relative to each other as needed to permit particulate contaminants to be trapped in said layer(s). In addition, the relative movement among the gravel particles is of assistance in permitting backwashing liquid to move through the supporting layers and into the filter media with the required velocity to provide the desired cleansing of the filter bed.

However, since the gravel particles are not constrained against relative movement, excessive and uncontrolled shifting of such particles has been known to occur, particularly during backwashing. This excessive and uncontrolled shifting of gravel particles causes "bed upset", resulting in an undesired channeling of liquid through the filter bed. When this occurs it is often necessary to shut down the filter, remove the filter media and the supporting gravel layer(s), and thereafter recharge the system. In addition to increasing the material costs, by requiring the use of additional gravel to form the supporting layer(s) and additional particulate solids to form the filter bed, the "downtime" encountered while the filter is being recharged also is extremely undesirable.

In other filter systems strainers have been employed to both receive the liquid to be treated, after the liquid has passed through a particulate filter bed, and to assist in distributing liquid during the backwashing operation. These strainers commonly have been employed as part of a header-lateral system, such as is disclosed in U.S. Pat. No. 3,826,375, issued to Fournier, or have been mounted directly into a bottom wall of the filter. Although strainers have been employed in filter systems which do not utilize one or more layers of inert materials, such as gravel, to support a filter media bed, such strainers do have certain drawbacks. One of the most common problems experienced in using strainers is that the particulate solids of the filter media (and sometimes the solid contaminants required to be removed from the liquid being treated) tend to clog the strainer openings. When this occurs undesirably high pressure losses across the filter are created, thereby slowing down the filtering operation. Moreover, during backwashing the clogged strainers prevent the uniform distribution of backwashing liquid, thereby preventing the uniform cleansing of the particulate filter bed.

In view of the problems encountered with the above described prior art systems, and in an effort to either eliminate the use of relative expensive gravel supporting layer(s), or at least minimize the amount of gravel employed in such supporting layer(s), Applicants have invented unique barriers. These barriers are positioned downstream of a particulate solids filter bed, as determined by the direction of fluid flow through the filter during the filtering operation, and have elements thereof capable of simulating the desired movement of gravel particles in gravel supporting layers, while eliminating the possibility of excessive movement of the type resulting in bed upset and the undesired channeling of liquids during the filtering and backwashing operations.

OBJECTS OF THE INVENTION

It is a general object of this invention to eliminate or minimize undesired upsetting of a bed of particulate solids employed in a filter system.

It is a further object of this invention to provide a filter system employing particulate solids to filter out undesired contaminants in a liquid being treated, while eliminating or minimizing the need for using one or more inert layers of gravel particles or similar materials to support the particulate solids filter media.

It is a further object of this invention to provide a unique barrier for supporting particulate solids in a filter system, which barrier includes elements that are capable of only desired, limited movement during both filtration and backwashing operations.

It is a further object of this invention to provide a unique barrier downstream of a filter bed of particulate solids, wherein elements of the barrier are only capable of moving to a limited extent for the purpose of assisting in trapping undesired contaminants and permitting backwashing liquid to readily move into and through the filter media, while at the same time preventing excessive, uncontrolled movement of the type that creates bed upset and undesired channeling of the liquid.

SUMMARY OF THE INVENTION

The above and other objects of this invention are provided by a filter system including an inlet for fluid to be treated, an outlet downstream of said inlet for receiving the treated effluent, and a fluid-solids contact chamber between said inlet and outlet including a filter bed of particulate solids through which the influent is directed in a downstream direction for treatment. In accordance with this invention a barrier, preferably of a synthetic plastic material, is positioned downstream of the particulate solids to prevent the undesired removal of particulate solids of the filter bed from the filter during the filtering operation, and also to assist in distributing liquid uniformly into and through the filter bed during backwashing. The barrier includes an anchoring member and a plurality of flexible members joined to said anchoring member and extending outwardly therefrom. The flexible members are closely spaced to each other for providing a closely-spaced network of said flexible members, said network providing multiple layers of flexible members in the downstream direction of fluid flow through said barrier during filtration.

In the preferred embodiments of the invention the barrier includes a plurality of anchoring members spaced-apart from each other and a plurality of flexible members joined to said anchoring members and projecting into the spaces between said anchoring members. The flexible members in these spaces are closely spaced to each other for providing the closely-spaced network of said flexible members.

In one embodiment of this invention the anchoring members are vertically oriented and are horizontally spaced-apart from each other over an area generally coextensive with a horizontal supporting wall that constitutes the upper wall of an underdrain system of the filter. In this embodiment the flexible members extend laterally, in a generally horizontal direction, into the spaces between the adjacent anchoring members to provide the closely-spaced network. In a preferred embodiment the flexible projections extend into the spaces from each of the anchoring members that define such spaces to provide a staggered, intermeshing network of the flexible members. However, it is within the scope of the invention to provide laterally extending flexible members from only one of the anchoring members of the pair of spaced-apart anchoring members that define the space into which the flexible members extend.

In accordance with another embodiment with this invention the barrier is incorporated into a strainer, and includes a plurality of anchoring members oriented in a generally horizontal plane and being vertically spaced apart from each other. In this embodiment the flexible members joined to the anchoring members extend generally vertically into the spaces between adjacent anchoring members to provide the closely-spaced network of said members, through which fluid to be treated is required to pass prior to exiting the outlet of the filter. In this embodiment the strainers can either be mounted in the laterals of a conventional header-lateral system of the general type disclosed in U.S. Pat. No. 3,826,375, issued to Fournier, and incorporated herein by reference, or can be directly mounted into a bottom wall of the filter.

BRIEF DESCRIPTION OF THE DRAWINGS

Other objects and many of the attendant advantages of the instant invention will be readily appreciated as the same becomes better understood by reference to the following detailed description when considered in connection with the accompanying drawings wherein.

DESCRIPTION OF THE BEST MODES OF THE INVENTION

Figure 1:
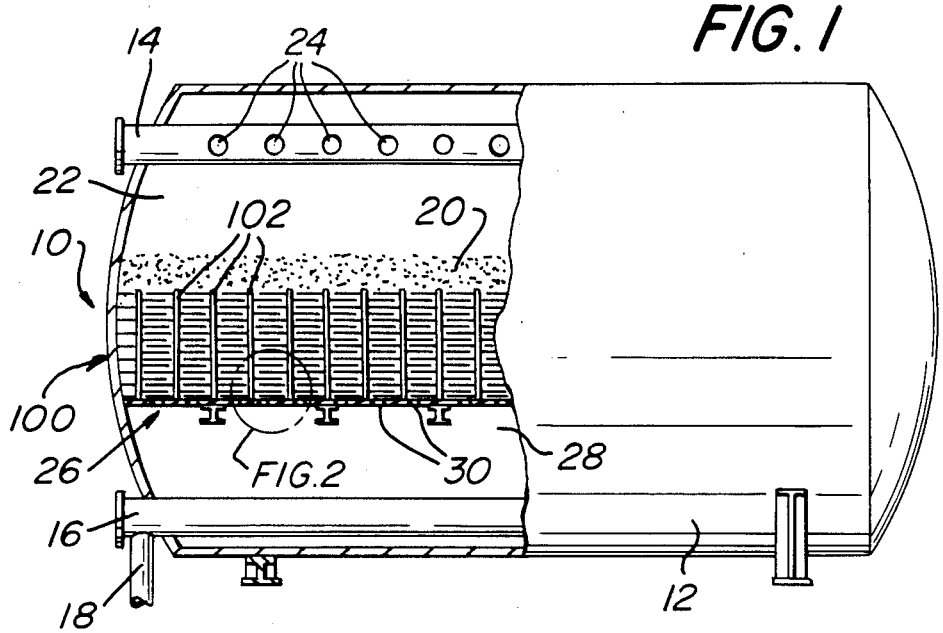
FIG. 1 is a side elevational view of a filter system, with parts broken away, showing a barrier in accordance with this invention.

Referring now in greater detail to the various figures of the drawings wherein like reference characters refer to like parts, a filter employing an improved barrier of the present invention is generally shown at 10 in FIG. 1. The filter 10 generally comprises an outer housing 12 having an inlet conduit 14 for receiving influent to be treated, an outlet conduit 16 for treated effluent, and a backwash conduit 18 for receiving backwashing liquid for the purpose of backwashing a filter bed of particulate solids 20 (e.g., sand, garnet, anthracite, activated carbon, silica gel, activated alumina, etc.) which is located in liquid-solids contacting chamber 22 of the filter.

In accordance with one embodiment of this invention a unique barrier 100 is positioned downstream of the filter bed 20 and functions to support the particulate solids of said bed and to prevent the particulate solids from being washed out of the filter 10 with the treated effluent. The barrier 100 includes flexible elements capable of controlled migration to provide unique benefits, as will be explained in greater detail hereinafter.

The filter further includes a conventional bottom wall 26 (e.g., a wheeler bottom, or tile bottom) which is located above the lower wall of the housing 12 and defines, with said lower wall, an underdrain 28. The underdrain is in communication with the liquid-solids contacting chamber 22 through a series of passageways 30 provided through the bottom wall 26. As a result of this arrangement the influent to be treated is directed into the inlet conduit 14 and passages through a series of fluid distributing openings 24 into the liquid-solids contacting chambers 22. Thereafter, the fluid to be treated passes in a downstream direction through the filter bed of particulate solids 20 for removing undesired contaminants.

It should be noted that undesired contaminants in the form of particulate material passing with the fluid to be treated through the filter bed 20 can be trapped within the barrier layer 100, prior to the treated effluent passing into the underdrain 28. The treated effluent in the underdrain 28 enters the outlet conduit 16 through a plurality of openings in the periphery thereof (not shown), and thereafter exits through the outlet conduit 16 to a point of storage or use, as desired.

To backwash the filter 10 between filter runs a valve (not shown) in the outlet conduit 16 is closed, and a valve (not shown) in the backwash conduit 18 is opened. Thereafter, backwash liquid is directed through the conduit 18, into the underdrain 28, through the passageways 30 in the bottom wall 26, through the barrier 100 and through the particulate solids of the filter media to thereby clean out said media.

Figure 2:
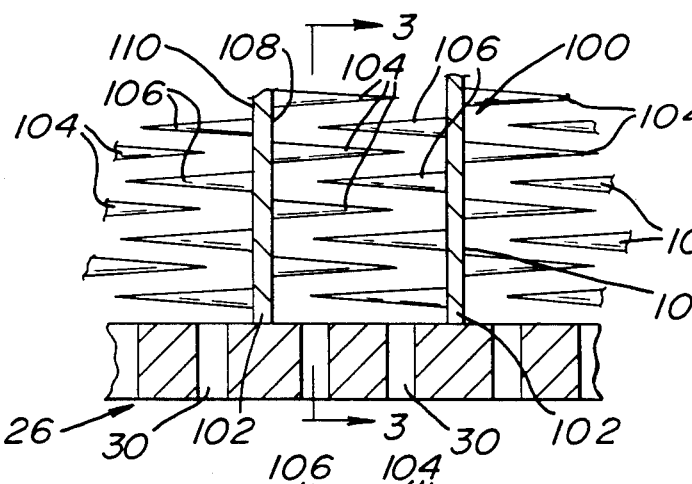
FIG. 2 is an enlarged view of the circled area identified in FIG. 1.
Figure 3:
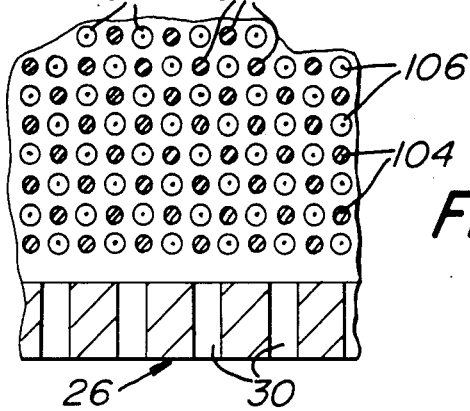
FIG. 3 is an enlarged sectional view taken along line 3—3 of FIG. 2, showing the closely-spaced network of flexible members in the barrier.

Referring specifically to FIGS. 1-3, the barrier 100 of this invention supports the filter bed of particulate solids 20. This barrier is capable of replacing all or at least part of inert layers of particulate material, such as gravel, which commonly have been employed in prior art systems to support the finer particulate solids of the filter bed.

Referring specifically to FIG. 1, the barrier 100 is in the form of a planar member that is generally coextensive with the bottom wall 26 upon which it is supported. The barrier 100 includes a plurality of substantially parallel, vertically orientated plate-like anchoring members 102 which can be connected in a desired spaced-apart orientation in a number of different ways. For example, the lower ends of the anchoring members can be welded directly to the bottom wall 26. Alternatively, the bottom wall 26 can be provided with a series of anchoring grooves into which the anchoring members 102 can be inserted. An additional way of interconnecting the anchoring members 102 is to provide side braces, in the form of metal straps or similar connecting elements, which are welded or otherwise secured to the anchoring members 102 along opposite side surfaces thereof. It should be understood that other techniques may be employed to interconnect the anchoring members 102, the important feature being that the anchoring members 102 are maintained in their desired positional relationship relative to each other.

Referring specifically to FIGS. 2 and 3, a plurality of flexible, bristle-like members 104 and 106 extend laterally from opposed surfaces 108 and 110, respectively, of each of the anchoring members 102, into the spaces provided between adjacent anchoring members. In the embodiment illustrated in FIGS. 2 and 3 the flexible members extend laterally, in a direction substantially perpendicular to the surfaces 108 and 110 to which they are joined.

As can be seen in FIGS. 2 and 3 the flexible members 104 extending laterally from the surfaces 108 are spaced apart from each other both horizontally and vertically along the anchoring member 102 to which it is joined. The flexible members 106 that extend laterally from the surfaces 110 are staggered relative to the flexible members 104 so that they are located between the flexible members 104 in the spaced-apart regions between adjacent anchoring members 102. This arrangement can be seen best in FIG. 3 which illustrates the closely spaced-apart network of flexible members 104 and 106 that is formed by the interdigitation of those members.

It is important that the network of flexible members 104, 106 be closely-spaced to prevent the fine particulate solids of the filter media from passing through the barrier 100 and being removed from the filter 10 with the treated effluent. In this regard, it should be noted that the barrier 100 has multiple layers of flexible elements 104 and 106, located in multiple planes in the downstream direction of fluid flow, so as to virtually insure that the particulate solids of the filter media will not pass completely through said barrier and exit the filter with the effluent.

A further advantage of the barrier 100 of this invention is that the members 104 and 106 are flexible, thereby permitting limited movement between them to trap larger particulate materials, such as solid contaminants which desirably should be removed from the fluid being treated, but happen to pass through the particulate solids of the filter media. However, the flexible members 104 and 106 are precluded from moving excessively relative to each other due to the fact that they are joined, or anchored, to their respective anchoring members 102. Thus, excessive movement of the elements relative to each other, of the type that can take place in a gravel layer, cannot occur in the barrier 100 of this invention.

A further advantage of the barrier 100 is achieved during backwashing of the filter. In this operation a backwashing liquid is directed through the backwashing conduit 18, in a direction opposite to the direction of fluid flow during the filtering operation, for the purpose of cleaning the filter bed 20 between filter runs, as is well known in the art. In order to effectively accomplish this result it is important that the filter bed be expanded to permit removal of trapped solids therefrom. In the present invention the velocity of the backwash liquid will cause limited, movement, or migration, of the flexible members 104 and 106 to permit the fluid to enter the filter bed 20 with sufficient velocity to expand said bed and clean out the undesired contaminants. However, due to the fact that the flexible elements are actually joined to the anchoring members 102 they are not capable of excessive migration, of the type that causes bed upset and undesired fluid channeling.

The spacing between respective flexible members 104 and 106 relative to each other is dictated by the average particle size of the solids making up the filter bed 20. In an illustrative embodiment the maximum diameter of the flexible members, which taper to a smaller diameter in a direction away from the anchoring members 102, is on the order of 2 mm. These flexible members are spaced apart from each other such that the interdigitating network is in the form of closely-spaced rows and columns of such members, as is shown best in FIG. 3. In an illustrative embodiment of the invention adjacent flexible members 104 and 106, in both the rows and columns, are located on 2.5 mm centers. Thus, the actual spacing between the outer surfaces of the members will be on the order of 0.5 mm.

Figure 4:
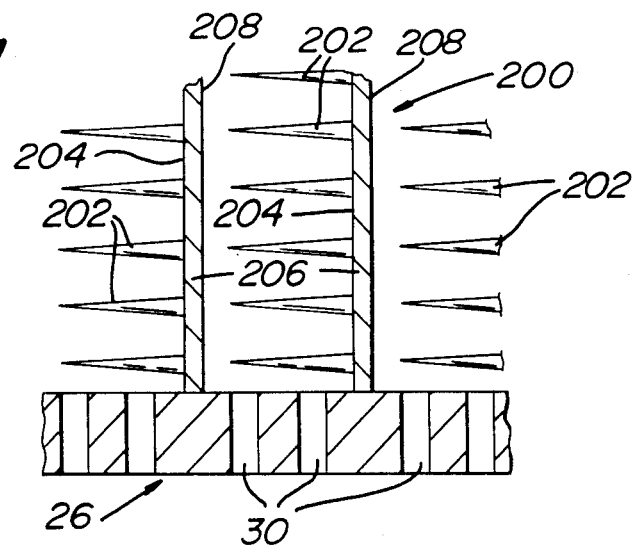
FIG. 4 is an enlarged view of the circled area shown in FIG. 1, but illustrating an alternative embodiment of the invention.

Referring to FIG. 4, a second embodiment of a barrier is illustrated at 200. This embodiment is identical to the embodiment illustrated at FIGS. 1 through 3, except that a plurality of flexible members 202, identical in construction to the flexible members 104 and 106, extend laterally from only one surface 204 of the substantially parallel, vertically orientated plate-like anchoring members 206. The anchoring members 206 of the barrier 200 can be located and secured relative to each other in the same manner as the anchoring members 102.

Of course, when the flexible members extend from only one surface of the anchoring members, as shown in FIG. 4, it is generally required that they be spaced closer to each other than in a system wherein flexible members project into a common space from adjacent anchoring members to interdigitate with each other, as in the embodiment illustrated in FIGS. 1 through 3. One possible deficiency of the embodiment illustrated in FIG. 4 is that, unless the free ends of the laterally extending flexible members 202 are very close to the surface of an adjacent anchoring member 206, a vertical channel, free of flexible members, will extend in a downstream direction through the barrier 200 toward the bottom wall 26. Such channels are shown at 208 in FIG. 4, and can result in undesired variations in fluid flow through the barrier, particularly during backwashing.

Figure 5:
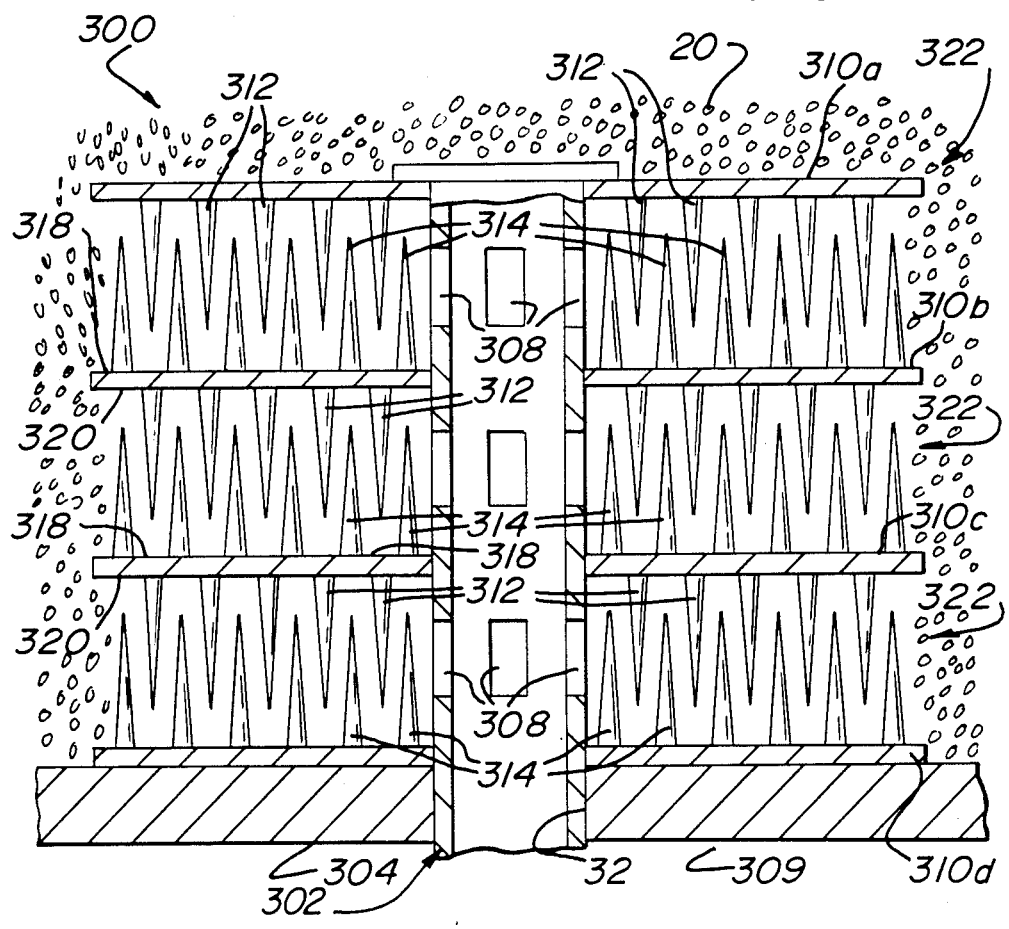
FIG. 5 is a greatly enlarged view of a portion of a strainer employing the unique features of this invention.

Referring to FIG. 5, a third embodiment of the invention is illustrated in the form of a strainer 300. It is understood that a plurality of these strainers are utilized in a filter system, either as part of a header-lateral flow control arrangement of the type illustrated in the Fournier '375 patent, which was incorporated herein by reference earlier in this application, or they can be mounted directly into spaced-apart openings formed in a conventional bottom wall. When employed with a conventional bottom wall the strainers provide the flow passages for both the liquid to be treated and the backwashing liquid during the filtering and backwashing operations, respectively.

In FIG. 5 only a single strainer 300 is shown, and this strainer is illustrated as extending through a passageway 32 in a bottom wall 304. It should be understood that the bottom wall 304 can form the upper wall of an underdrain, in the same manner as the bottom wall 26 in the embodiment illustrated in FIG. 1.

When strainers of the type illustrated at 300 in FIG. 5 are utilized, the influent to be treated passes in a downstream direction through a filter bed of particulate solids 20, then laterally through the multiple barrier system of the strainer, which will be described in greater detail hereinafter, and then into a central pipe or conduit 302 through a plurality of axially spaced-apart sets of circumferentially spaced-apart openings 308. The treated effluent passing through the conduit 302 flows into an underdrain 309, below the bottom wall 304, and then exits through an outlet conduit of the filter (not shown).

It should be noted that in this embodiment the strainer 300 includes a plurality of parallel, plate-like anchoring members 310a-d which are orientated in a generally horizontal plane, and which are spaced-apart vertically from each other. In one embodiment of the invention each of the anchoring members 310a-d is circular, as viewed in plan, with the central pipe 302 being located at the centers thereof. Of course, other geometric configurations can be employed, such as squares, rectangles, etc.

Still referring to FIG. 5, the strainer 300 includes four vertically spaced apart anchoring members 310a, 310b, 310c, and 310d. However, it should be understood that the number of such anchoring members does not constitute a limitation of the present invention, and can be more or less, as desired.

The upper and lower plates 310a and 310d each include only a single set of flexible members 312 and 314, respectively. The set 312 extends vertically downwardly from plate 310a and the set 314 extends vertically upwardly from plate 310d, as viewed in FIG. 5. The remaining two anchoring members 310b and 310c each include two sets of spaced-apart flexible members. One set includes a plurality of laterally spaced-apart flexible members 314 extending vertically upwardly from the upwardly facing horizontal surfaces 318 of said anchoring members 310b and 310c. The other set includes a plurality of laterally spaced-apart downwardly extending flexible members 312 joined to and extending downwardly from the opposed, downwardly facing horizontal surfaces 320 of the anchoring members 310b and 310c.

As can be seen in FIG. 5, flexible members 312, 314 joined to adjacent spaced-apart anchoring members project into a common space between said anchoring members and interdigitate with each other, in the same manner as described earlier in connection with the embodiment illustrated in FIGS. 1 through 3. Thus, the interdigitating flexbile members 312, 314 provide a closely spaced network of flexible members, similar to that shown in FIG. 3, thereby providing multiple layers of barriers in the downstream direction of fluid flow between anchoring members, as illustrated by arrows 322.

One of the major benefits of this invention is that the barriers 100, 200 and 300, present multiple layers of flexible members in the path of fluid flow through them. Thus, if either particulate solids of the filter bed 20, or particulate contaminants to be removed from the fluid being treated pass through the outermost layer of flexible members, the chances are good that subsequent layers will trap such particulate materials and thereby prevent them from exiting the filter along with the treated effluent.

In accordance with a preferred feature of this invention the flexible members are integrally molded with the anchoring member to which they are joined to thereby provide a unitary system. The material employed to form the anchorihg members and flexible members is a matter of design choice, but should be selected to permit the flexible members to bend relative to the anchoring members, without breaking. Thus, the brittleness of the material employed to mold or otherwise form the components of the barriers must be considered. It is believed that the individual anchoring members, with the flexible members joined to it can be molded from such plastic materials as Nylon, polyproylene, polyvinylchloride, and possibly others.

Without further elaboration, the foregoing will so fully illustrate my invention that others may, by applying current or future knowledge, readily adopt the same for use under various conditions of service.

What is claimed as the invention is:

1. A filter including an inlet means for fluid to be treated, an outlet means downstream of said inlet means for treated effluent and means defining a fluid-solids contact chamber between said inlet means and outlet means; said fluid-solids contact chamber including particulate solids through which the fluid to be treated is adapted to pass in a downstream direction for removal of contaminants from said fluid, and a barrier downstream of, and in engagement with said particulate solids, said barrier including an anchoring member and a plurality of flexible members joined to said anchoring member and extending outwardly therefrom, said flexible members being closely spaced to each other for providing a closely-spaced network of said flexible members, said network providing multiple layers of flexible members in the downstream direction of fluid flow through said barrier during filtration.

2. The filter of claim 1 wherein said barrier includes a plurality of anchoring members spaced-apart from each other and a plurality of flexible members projecting into the spaces between adjacent anchoring members, said flexible members being closely spaced to adjacent flexible members within the spaces between adjacent anchoring members to form said closely-spaced network of said flexible members.

3. The filter of claim 2 wherein the anchoring members have opposed surfaces, said flexible members projecting laterally from each of the opposed surfaces of at least some of said anchoring members.

4. The filter of claim 2 wherein the space between at least two adjacent anchoring members includes flexible members joined to each of said at least two adjacent anchoring members, the flexible members joined to one of said at least two adjacent anchoring members being staggered relative to the flexible member joined to the other of said at least two adjacent anchoring members to interdigitate with said latter flexible members.

5. The filter of claim 2 wherein the flexible members project outwardly from only one side of said anchoring members.

6. The filter of claim 2 wherein said anchoring members are spaced-apart horizontally from each other and said flexible members extend outwardly from said anchoring members in a generally horizontal direction, a plurality of flexible members joined to each of the anchoring members being vertically spaced-apart in the direction of fluid flow to thereby provide multiple barrier layers in the direction of fluid flow through said barrier.

7. The filter of claim 6 wherein said barrier is a generally planar member comprising said plurality of horizontally spaced-apart anchoring members and flexible members projecting therefrom, said barrier being supported on a liquid pervious wall of the filter.

8. The filter of claim 2 wherein the particulate solids do not include a gravel layer either as part of its construction or as a supporting layer therefor.

9. The filter of claim 2 wherein the plurality of anchoring members are spaced-apart vertically from each other and said flexible members extend outwardly from the anchoring members in a generally vertical direction into the spaces between adjacent anchoring members, a plurality of flexible members joined to each of the anchoring members being horizontally spaced apart from each other in the direction of fluid flow between adjacent anchoring members to provide multiple barrier layers of flexible members in the path of fluid flow.

10. The filter of claim 9 including a vertical conduit joined to the vertically spaced-apart anchoring members and having passage means therethrough communicating with the spaces between adjacent anchoring members and located downstream from the multiple layers of flexible members for receiving treated effluent after said effluent has passed said multiple layers, said conduit communicating with the outlet means from said filter.

11. The filter of claim 2 wherein each of the anchoring members and the flexible members joined thereto are molded as a single unitary member.

12. The filter of claim 2 including a backwashing conduit means through which backwashing liquid is adapted to be directed into said chamber, said backwashing liquid being directed through the multiple layers of flexible members in a direction opposed to the downstream direction of fluid flow during filtration.

13. The filter of claim 1 wherein the anchoring member and the flexible members joined thereto are molded as a single unitary member.

14. The filter of claim 1 including a backwashing conduit means through which backwashing liquid is adapted to be directed into said chamber, said backwashing liquid being directed through the multiple layers of flexible members in a direction opposed to the downstream direction of fluid flow during filtration.

15. The filter of claim 1 wherein said barrier includes a plurality of horizontally spaced-apart anchoring members, said plurality of flexible members being joined to said anchoring members and extending outwardly from a surface of said anchoring members into spaces between adjacent anchoring members.

16. The filter of claim 1 wherein said inlet means comprises means for supplying liquid to be treated.

17. A strainer for use in a filter, said strainer including a plurality of anchoring members spaced-apart from each other in a first direction to provide a space between adjacent anchoring members, a plurality of flexible members joined to said anchoring members, said flexible members extending outwardly from the anchoring members into the spaces between adjacent anchoring members and being oriented generally in said first adjacent, said anchoring members in each of said spaces being closely spaced to each other in a direction laterally of said first direction to form multiple layers of said flexible members, said multiple layers being spaced apart from each other in a direction laterally of said first direction, conduit means joined to said anchoring members and having surface means defining an elongate passageway therethrough for communicating with the outlet from a filter in which the strainer is to be used, said conduit means having a side wall with passage means therethrough, said passage means being in communication with said elongate passageway and also located in alignment with the spaces between adjacent anchoring members for receiving the flow of fluid to be treated after said fluid has passed through the multiple layers of flexible members disposed in the spaces of the strainer.

18. The strainer of claim 17 wherein the conduit means is connected substantially centrally to each of the spaced-apart anchoring members, said plurality of flexible members in each of the spaces being spaced apart from each other in a direction from the outer periphery of the anchoring members, spaced from the conduit means, to the conduit means for providing the multiple layers of flexible members in the path of fluid flow through the spaces between the adjacent anchoring members.

19. The strainer of claim 18 wherein each of the anchoring members is substantially circular in plan view, and said central conduit means joins the spaced-apart anchoring members at the centers thereof.

20. In a filter having an inlet means for fluid to be treated and an outlet means downstream of said inlet means for treated fluid, a barrier disposed between said inlet means and said outlet means, said barrier including a plurality of spaced-apart anchoring members and a plurality of flexible members joined to said anchoring members and extending outwardly from the surface of said anchoring members into spaces between adjacent anchoring members, said flexible members in the spaces between adjacent anchoring members being closely spaced to each other in the downstream direction of fluid flow from the inlet means to the outlet means to form multiple layers of said flexible members, said multiple layers being spaced apart in said downstream direction of fluid flow.

21. In the filter of claim 20, the flexible members of said barrier projecting into the spaces between adjacent anchoring members from each of said adjacent anchoring members to which the flexible members are joined, the flexible members joined to one of said anchoring members interdigitating with the flexible members joined to the other of said anchoring members.

22. In the filter of claim 20, said anchoring members of the barrier being horizontally spaced-apart from each other.

23. In the filter of claim 20, said inlet means comprising means for supplying liquid to be treated.

* * * * *